United States Patent
Denison et al.

(10) Patent No.: US 11,837,039 B2
(45) Date of Patent: *Dec. 5, 2023

(54) ACCESS CONTROL ELECTRONICS FOR WIRELESS LOCKS

(71) Applicant: TriTeq Lock and Security, L.L.C., Elk Grove Village, IL (US)

(72) Inventors: William D. Denison, North Barrington, IL (US); Calin V. Roatis, Long Grove, IL (US); Thaddeus A. Meizelis, Sycamore, IL (US); Daniel R. Michelson, Des Plaines, IL (US); Gabriel Ribu, Niles, IL (US)

(73) Assignee: Triteq Lock and Security, L.L.C., Elk Grove Village, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,047

(22) Filed: Oct. 27, 2022

(65) Prior Publication Data
US 2023/0124817 A1 Apr. 20, 2023

Related U.S. Application Data

(63) Continuation of application No. 17/174,828, filed on Feb. 12, 2021, now Pat. No. 11,488,429, which is a continuation of application No. 16/104,120, filed on Aug. 16, 2018, now Pat. No. 10,964,139, which is a continuation-in-part of application No. 15/059,633, filed on Mar. 3, 2016, now Pat. No. 10,329,795, (Continued)

(51) Int. Cl.
*G07C 9/00* (2020.01)
*G06K 19/07* (2006.01)
*G06K 7/10* (2006.01)
*G06K 17/00* (2006.01)
*G07C 9/38* (2020.01)

(52) U.S. Cl.
CPC ..... *G07C 9/00309* (2013.01); *G06K 7/10128* (2013.01); *G06K 7/10415* (2013.01); *G06K 17/0029* (2013.01); *G06K 19/0723* (2013.01); *G07C 9/38* (2020.01); *G07C 9/0069* (2013.01); *G07C 2009/00769* (2013.01); *Y10T 70/7062* (2015.04)

(58) Field of Classification Search
None
See application file for complete search history.

(56) References Cited

U.S. PATENT DOCUMENTS 11,488,429 B2 * 11/2022 Denison ............. G06K 17/0029

* cited by examiner

Primary Examiner — Daniell L Negron
(74) Attorney, Agent, or Firm — Charles T. Riggs, Jr.

(57) ABSTRACT

Access control electronics for wireless locks comprise one or more battery operated radios that receive access control codes. The wireless accessed locks locate the electronic components, circuits, sensors and antennas and many of the lock components away from the container being secured and closer to the operator/user. The disclosed access control electronics combine a proximity detection circuit comprising sensor pads and a capacitive sensing circuit and one or more short-range radio frequency antennas for reading RFID devices. The proximity sensor pads are in close proximity with the antennas, without the antennas interfering with the proximity sensing process, and the sensor pads to not attenuate the signals between the RFID devices and the antennas after the RFID devices are detected.

20 Claims, 10 Drawing Sheets

Related U.S. Application Data which is a continuation-in-part of application No. 14/719,218, filed on May 21, 2015, now Pat. No. 10,273,715, which is a continuation of application No. PCT/US2014/038016, filed on May 14, 2014.

(60) Provisional application No. 62/547,584, filed on Aug. 18, 2017, provisional application No. 61/823,685, filed on May 15, 2013.

$R_{total} = R_x + R_b$
$R_x$ = touch current skin (when present)
$R_b$ = residual current unit

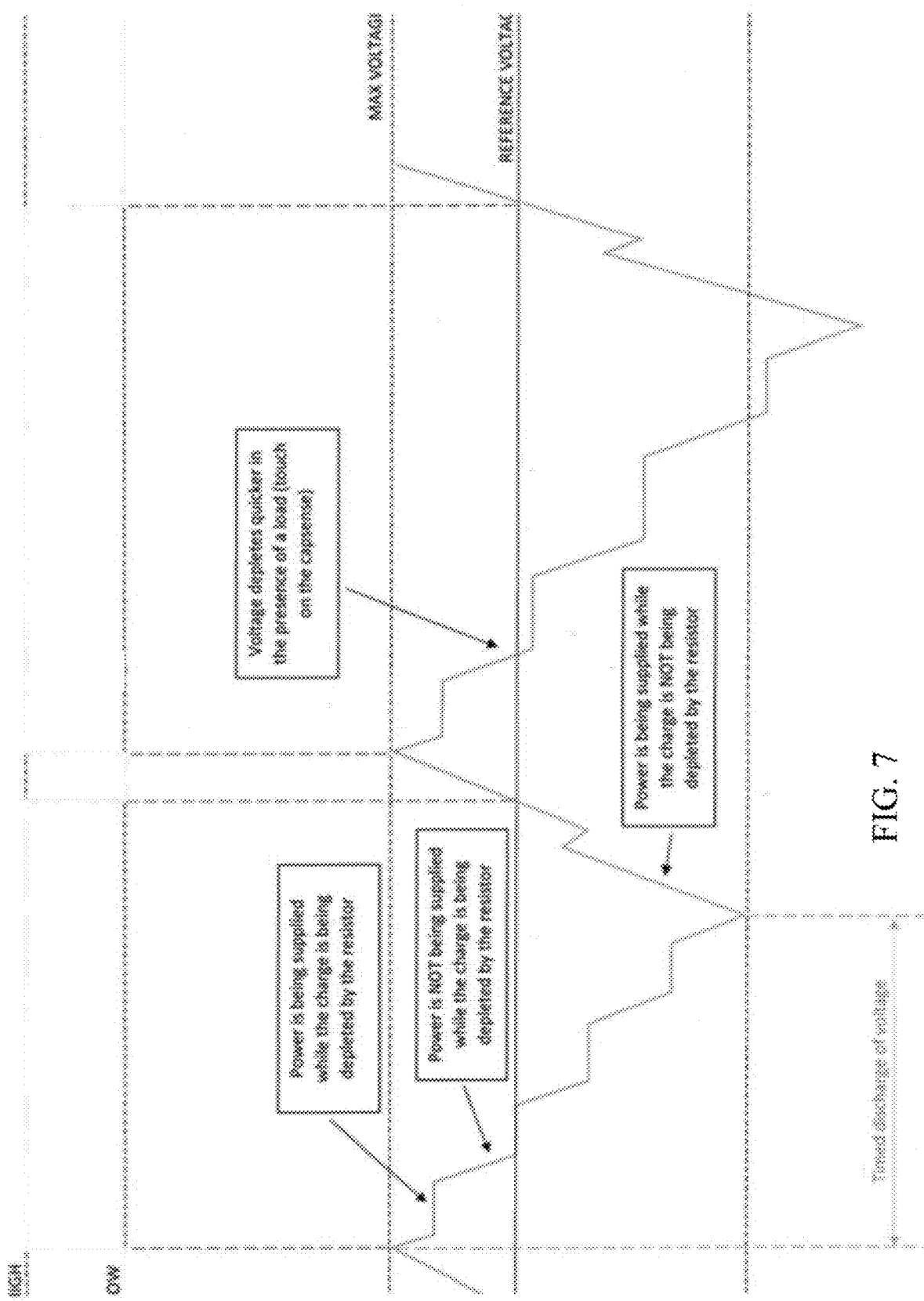

ACCESS CONTROL ELECTRONICS FOR WIRELESS LOCKS

RELATED APPLICATION

This application is a continuation of U.S. patent application Ser. No. 17/174,828 titled "Access Control Electronics for Wireless Locks," filed Feb. 12, 2021, now U.S. Pat. No. 11,488,429, which is a continuation of U.S. patent application Ser. No. 16/104,120, titled "Access Control Electronics for Wireless Locks," filed Aug. 16, 2018, now U.S. Pat. No. 10,964,139, which relates to and claims priority to U.S. provisional patent application no. 62/547,584 titled "Access Control Electronics for Wireless Locks", filed Aug. 18, 2017, the entire disclosure of which is incorporated herein by reference.

TECHNICAL FIELD

This application relates to access control electronics for wireless locks, and further relates to, incorporates certain aspects of and/or may be used in conjunction with the following pending U.S. patent applications, all of which are herein incorporated by reference: Ser. No. 14/719,218 entitled "Lock" and filed May 21, 2015 (Pub. No. 2015-0252591 A1 published Sep. 10, 2015); Ser. No. 14/728,996 entitled "Lock" and filed Jun. 2, 2015 (Pub No. 2016-0186463 A1 published Dec. 31, 2015); Ser. No. 15/059,633 entitled "Lock" and filed Mar. 3, 2016 (Pub. No. 2016-0186463 A1 published Jun. 30, 2016); and Ser. No. 15/082,019 entitled "Lock" and filed Mar. 28, 2016 (Pub. No. 2016-0208518 A1 published Jul. 21, 2016, the entire disclosures of which are incorporated herein by reference.

BACKGROUND AND SUMMARY

In the embodiment(s) disclosed herein, the lock housing encloses some different and enhanced electronic access control assemblies. Locks that utilize wireless forms of access control have their functional advantages but are very challenging to optimize from an engineering perspective. Wireless access potentially offer convenience and speed for the operator/user, but are demanding in terms of power dissipation, sensitivity to their surroundings, and packaging implementation.

The lock(s) of the embodiment(s) disclosed herein comprise one or more battery operated radios that receive access control codes. Such battery operated radios are problematic for a performance and power dissipation stand point. These radios must be designed to be power efficient to operate on small batteries of less than 1 amp-hour, but the trade-off is the performance of the radios are susceptible to deficiencies such as slow signal detection, false signal detection, and lost signal detection.

Most wireless accessed locks comprise of a lock mechanism, control and radio electronics inside the container being secured, and an antenna to receive the electronic signals located on the outside of the container in order to avoid interference and attenuation from a) the container, b) items stored in the container and c) the lock/latch mechanism materials (which are usually metallic). Mounting an antenna and routing wires to/from an antenna through an opening in the container being secured can be problematic. Containers and the lock/latch mechanisms inside the containers consist of different metallic materials, thicknesses, coatings, etc. Methods of routing the wires vary with different containers and installation workers. To electrically compensate for these variations, the radio circuits are typically designed to withstand attenuation effects from the container, items stored in the container and from the antenna being separate from the radio circuits. Designing for such radio frequency interference and attenuations typically requiring the radio circuits to transmit greater dbm levels and receive lower dbm levels (greater levels of sensitivity and noise filtering). Thus, these radio circuits will dissipate more power than radio circuits and antennas that are in very close proximity to each other and are not separated or surrounded by the container surface, items in the container and/or internal lock mechanisms.

The object of the wireless access embodiments are to offer the advantages of wireless access, but to overcome the problems associated with high power dissipation, radio interference between the multiple radios, interference from components in the secured enclosure such as the metallic enclosure itself and the metallic latch components, and operation inconvenience. It is one advantage to house or package as much of the electronic components, circuits, sensors and antennas and many of the lock components and offset them away from the container being secured and to move them closer to the operator/user. The closer these antennas and circuits are to the user, the more efficient they can operate, the less they are effected and attenuated by the secured container and the more efficient and faster they can operate and the less power they will consume. The closer these circuits can be packaged together the faster and the more power efficient they can operate. By reducing the distance from the radio receiver circuits to the antennas will serve to reduce stray capacitive, inductive and resistance impedance variations between the circuits and the antennas, thus eliminating the need to tune the circuits to compensate for the impedance effects of the secured enclosure.

In order to meet the power requirements and to dissipate less power, the embodiment combines a proximity detection circuit comprising sensor pads and a capacitive sensing circuit and one or more short-range radio frequency antennas (typically 125 KHz and 13.56 MHz) for reading RFID devices. The object is to provide proximity sensor pads in close proximity with the antennas to detect the RFID devices without the antennas interfering with the proximity sensing process, and for the sensor pads to not attenuate the signals between the RFID devices and the antennas after the RFID devices are detected.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 7 is a voltage chart of the Capacitive Prox Sensing block.

DETAILED DESCRIPTION

The following description refers to numerous specific details which are set forth by way of examples to provide a thorough understanding of the relevant teachings. It should be apparent to those skilled in the art that the present teachings may be practiced without such details. In other instances, well known methods, procedures, and components have been described at a relatively high-level, without detail, in order to avoid unnecessarily obscuring aspects of the present teachings.

Figure 1A:
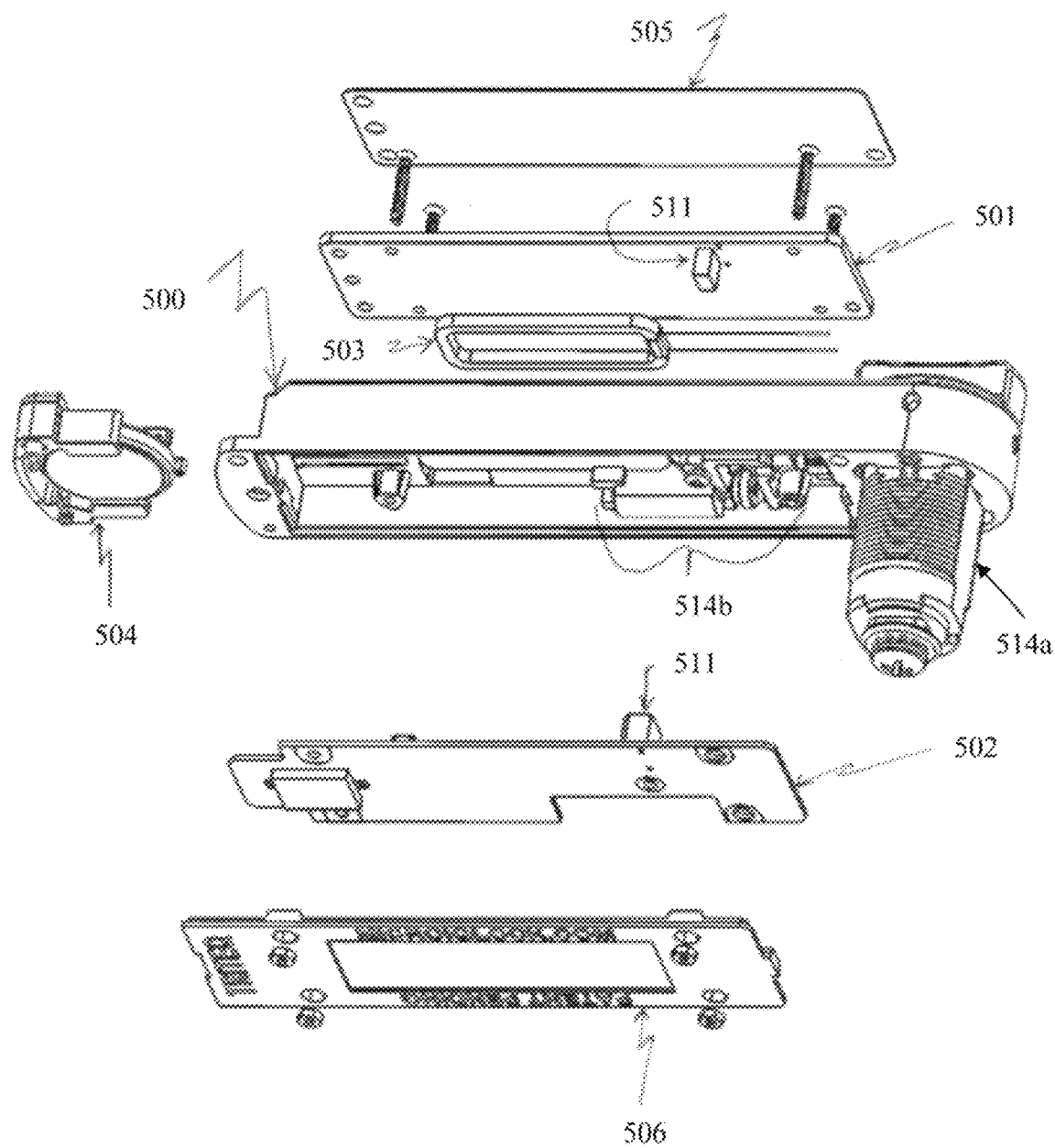
FIG. 1A is an exploded, bottom perspective view of a wireless lock incorporating the access control electronics of the present disclosure.
Figure 1B:
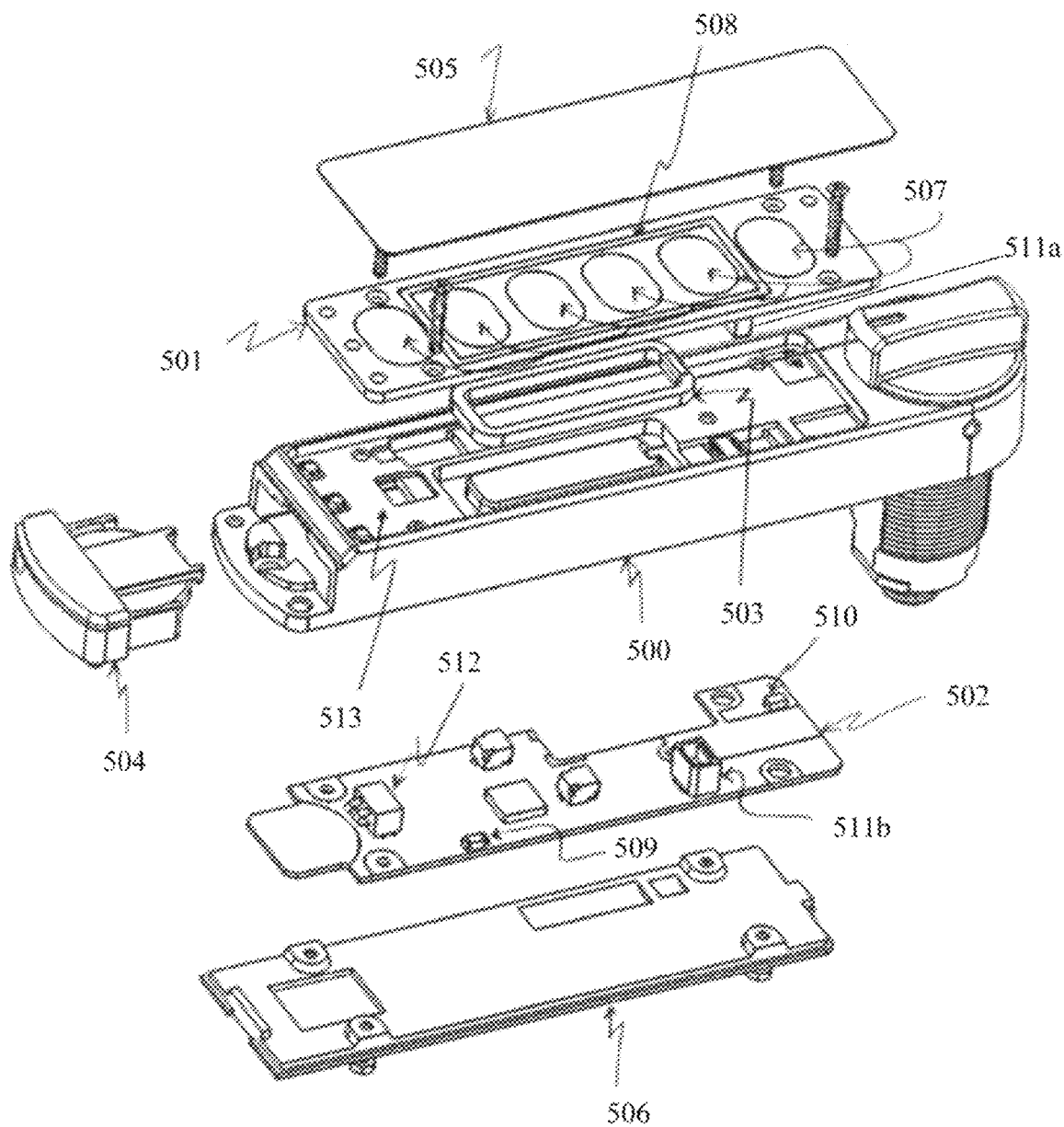
FIG. 1B is an exploded, top perspective view of the wireless lock incorporating the access control electronics of the present disclosure.

FIGS. 1A, 1B, 2 and 3 show external and exploded views of a housing 500 that encloses access control electronics comprising two circuit boards comprising radio frequency electronics 501 and 502, 125 KHz RFID antenna 503, battery and holder 504, keypad overlay 505, cover 506. FIG. 1B also shows proximity sensing pads 507, 13.56 MHz antenna 508 (routed around 4 sensor pads 507), Bluetooth antenna 509, latch position sensor 510, connector 511, and battery connector 512. Housing 500 is constructed with an internal wall 513 that serves to allow board 501 to rest on the top surface and remain separated from board 502 seated against wall 513 lower surface. Antenna 503 rests or sits in a generally corresponding sized and shaped pocket or recessed cut out in wall 513. The pocket or recessed cut out does not go completely through the wall. Instead, the antenna 503 rest against a lower/bottom section of the wall at the bottom of the pocket or recessed cut out, and remains separated from board 502. A hole in wall 513 allows connector 511a on board 501 to connect to connector 511b on board 502 when assembled. Housing 500, overlay 505, and cover 506 would typically be constructed from plastic or another non-metallic materials in order not to restrict the radio frequency signals. The lock and latch mechanism are shown at 514a and 514b respectively. Screws 515 serve to attach and align boards 501, 502, wall 513 together.

This embodiment describes some very unique ways of packaging and providing operation of multiple radios and operating frequencies, battery operated access control and proximity detection in order to conserve power when not in use.

Antenna 508 is connected to 13.56 MHz RFID circuitry and used to communicate with 13.56 MHz RFID transponders or NFC transceivers for access control or lock management. Typically this antenna is flat relative, for example on the top surface of a circuit board. The associated circuitry can both transmit and receive RF information.

Antenna 503 is connected to 125 KHz RFID circuitry and used to communicate with the 125 KHz RFID transponders for access control. Typically this antenna is several layers thick and across of conductive windings. The associated circuitry can both transmit and receive RF information.

Antenna 509 is connected to a Bluetooth low-energy (BLE) circuitry and used to communicate with BLE compatible devices such as smartphones, network routers, etc. for lock access and lock management. The associated circuitry can both transmit and receive RF information.

Figure 2:
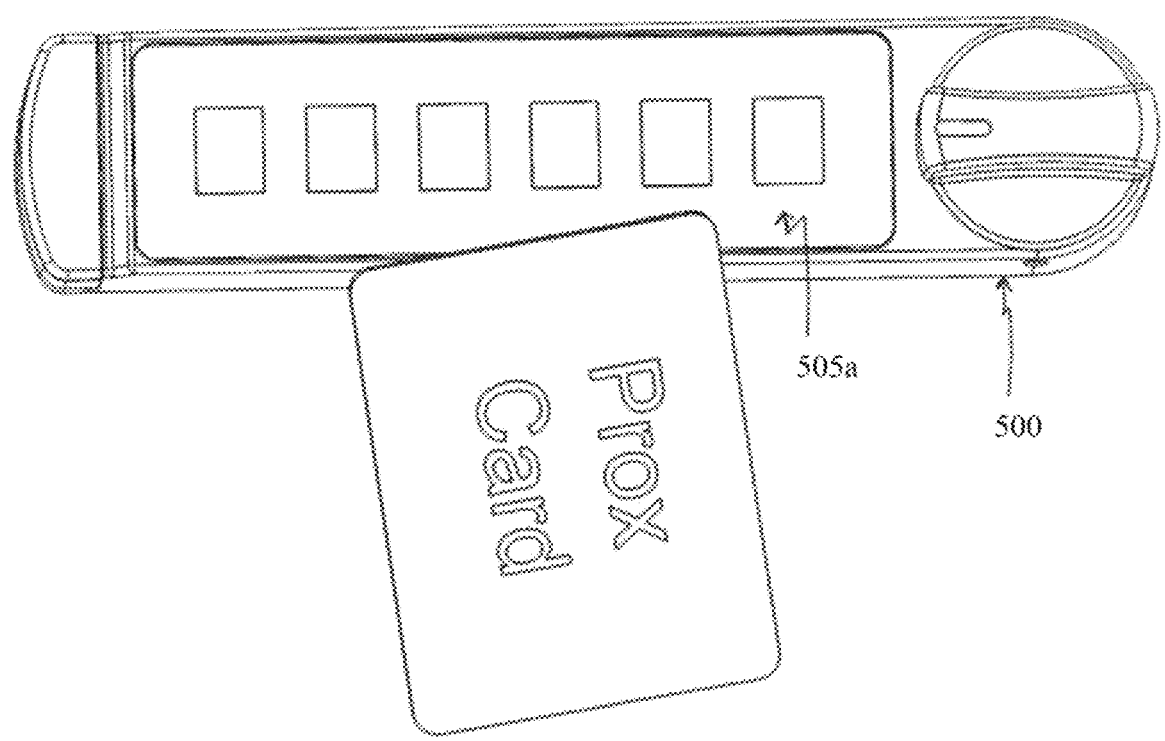
FIG. 2 is a front view of one embodiment of the wireless lock incorporating the access control electronics of the present disclosure.
Figure 3:
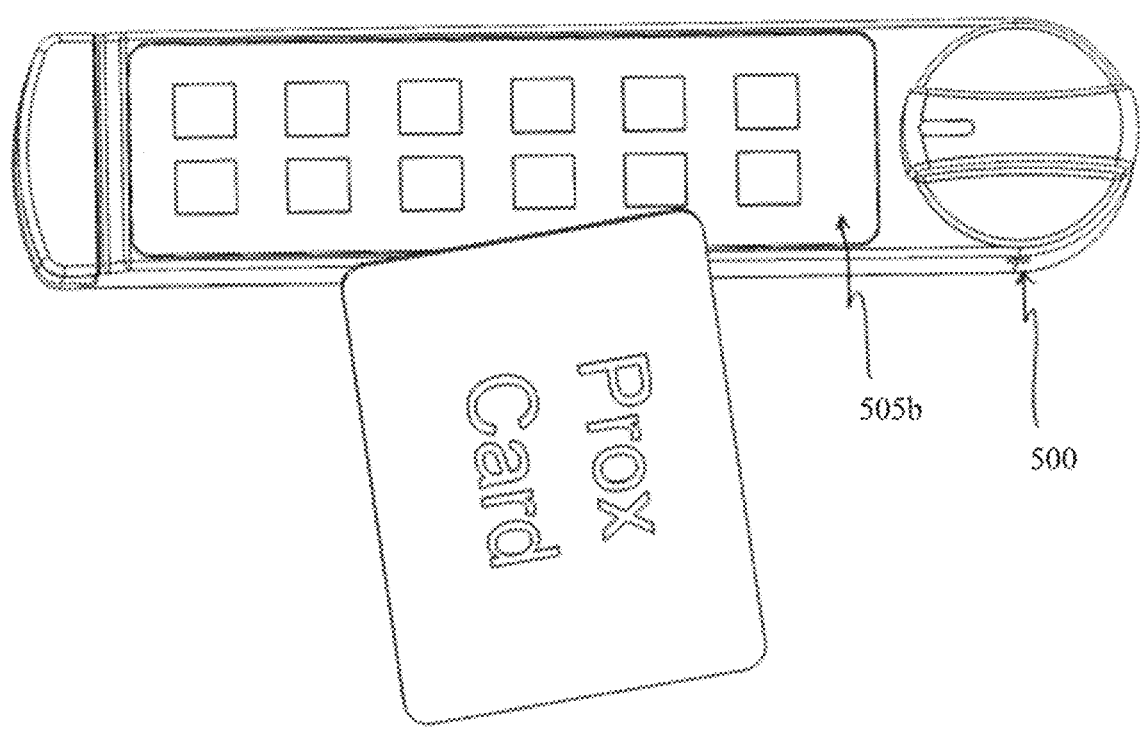
FIG. 3 is a front view of an alternate embodiment of the wireless lock incorporating the access control electronics of the present disclosure.

Proximity sensing pads 507 are used for multiple purposes, such as a) sensing the proximity of a device such as a smartphone, b) sensing a prox card or a dongle or fob enclosing an RFID transponder circuit (as shown in FIGS. 2, 3), and c) sensing a finger operating a capacitive-touch keypad for entering an access code or an operating command.

Pads 507 are typically an electrically conductive material such as copper, and would be connected via circuit board traces to a proximity detecting circuit. Pads 507 may be separate and individual in a horizontal (or vertical row) as shown in FIG. 1B. In FIG. 2, overlay 505a shows how a graphic on the overlay outlines how each pad can be touched individually by a finger. In FIG. 3, overlay 505b shows how, in an alternative embodiment, pads 507 can also be configured in two or more rows (or columns) of pads.

FIG. 1B shows pads 507 are individual, but in an alternative embodiment two or more of pads 507 may be electronically connected to become a long horizontal or a tall vertical conductive surface or pad configuration.

The figures show how each antenna and sensing pads can be configured to be on substantially equal horizontal planes, or can be configured to be on slightly different horizontal planes.

Proximity detection of RFID transponders offers some specific challenges. Proximity sensing of objects with capacitive sensing technology is difficult and more challenging than capacitive sensing of a finger because a) due to human placement error an object larger than a finger is usually not placed with as great of precision or it cannot be placed as close to a sensor pad as a finger can be placed directly on a sensor pad, b) proximity sensing usually requires a greater distance to sense an object, requiring a larger sensor pad area to produce a higher electric field strength, and c) a larger sensor pad area increases the pad capacitance, making detection of an object more difficult because detection of smaller changes in capacitance and filtering more noise is required, d) the packaging of RFID transponders vary and are inconsistent, i.e. transponders are packaged inconsistently, packaging materials plastic casings vary in material and thickness.

Due to these challenges the difference in capacitance to detect an object is much more difficult than detecting a finger because the signal to noise ratio is much smaller than it is for detecting a finger. Other challenges are temperature, humidity and moisture or liquid spillage on or around the sensor plate(s).

The detection challenges encountered using traditional analog capacitance sensing circuits are a) false object detection due to the requirement of high sensitivity and poor noise filtering, b) no detection, slow detection, and excessive power consumption in order to achieve accurate and fast object detection.

Figure 4:
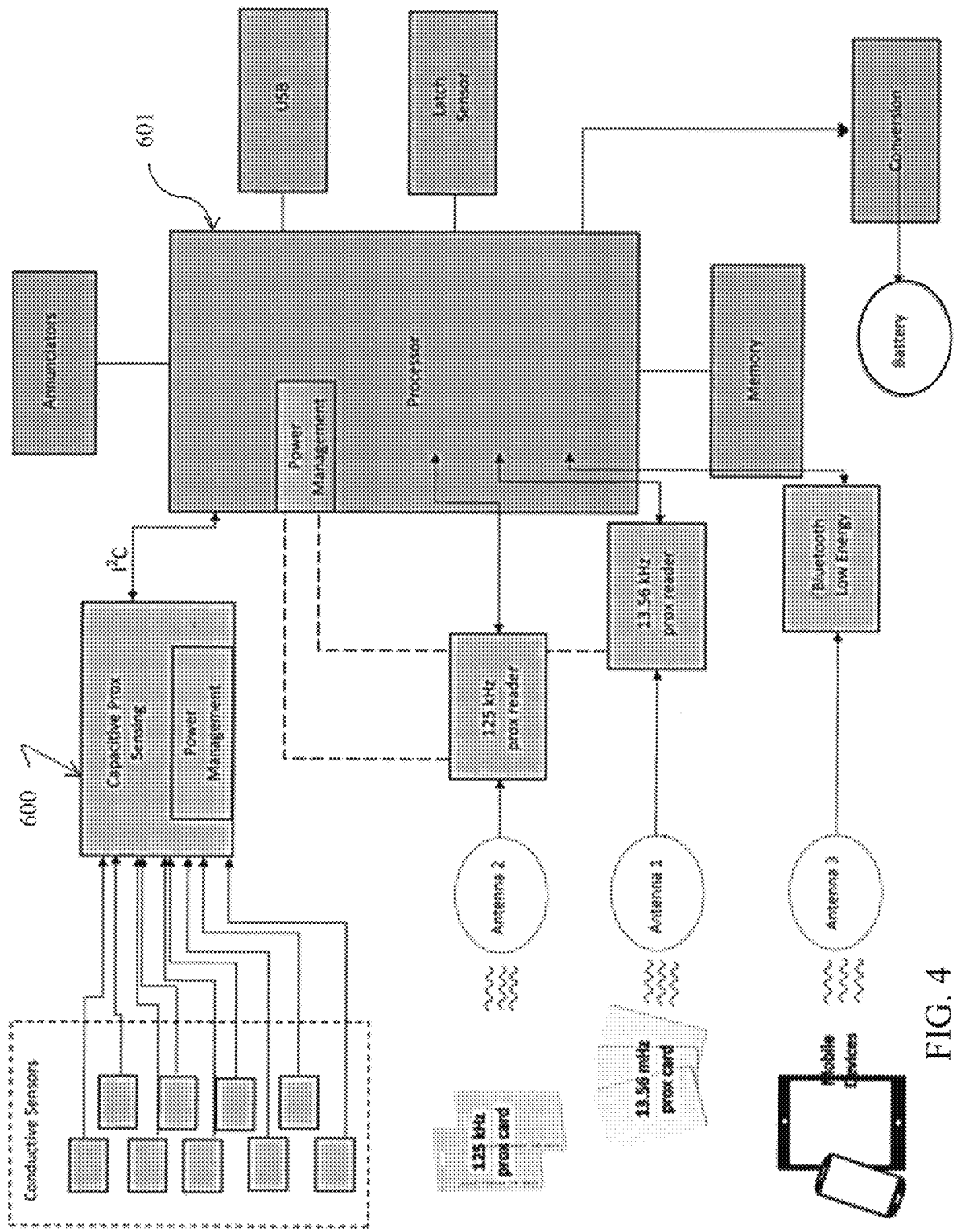
FIG. 4 is an overall block diagram of the access control electronics of the present disclosure.

FIG. 4 is the overall block diagram of the access control. The Capacitive Prox Sensing block 600 is illustrated in the main flow chart diagram of FIG. 5, and in further detail in FIGS. 6A-6C and FIG. 7, and described below. The Power Management blocks of Capacitive Prox Sensing block 600 and Processor 601 include timers that periodically wake up their circuits to detect changes from the outside world such as prox cards to be presented and fingers to operate the keypad.

Detailed Flow Chart Description

Figure 5:
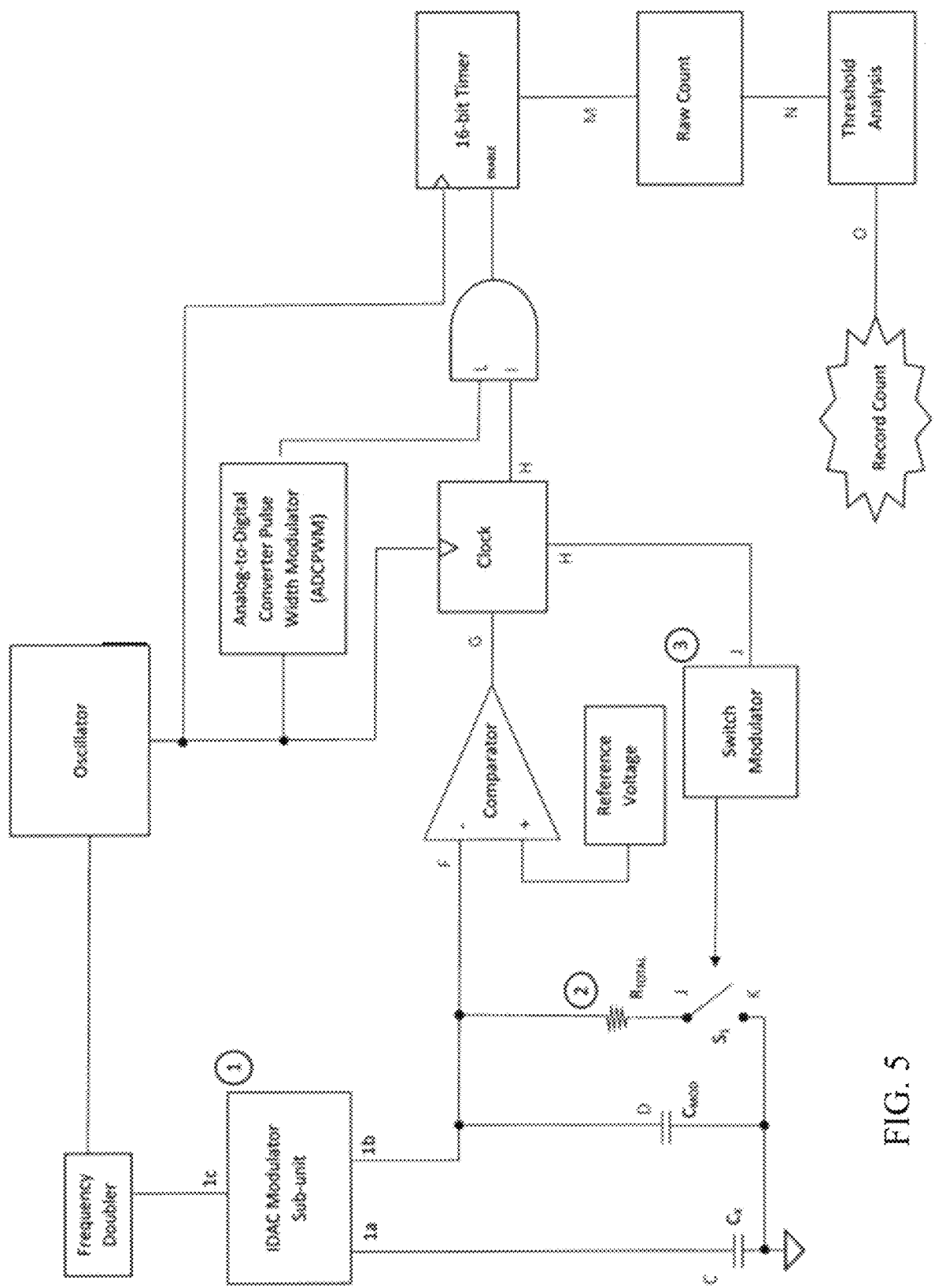
FIG. 5 is a main flow chart diagram of the Capacitive Prox Sensing block of FIG. 104.
Figure 6B:
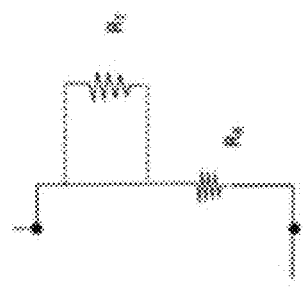
FIG. 6B is a diagram showing detail no. 2 of FIG. 5—the $R_{TOTAL}$.
Figure 6C:
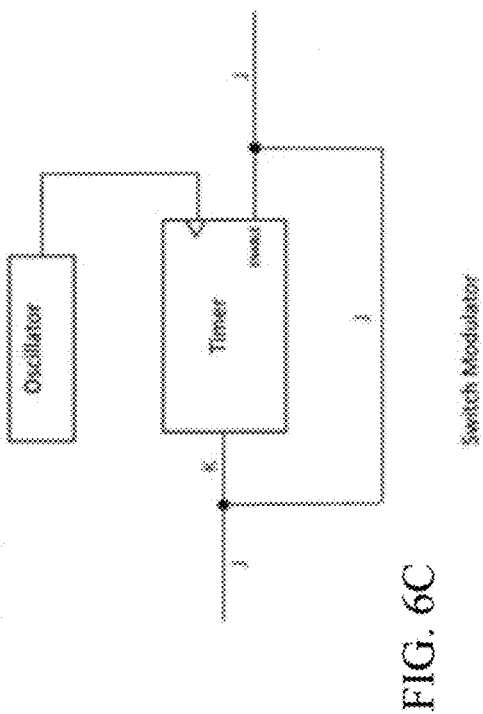
FIG. 6C is a diagram showing detail no. 3 of FIG. 5—the Switch Modulator.
Figure 6A:
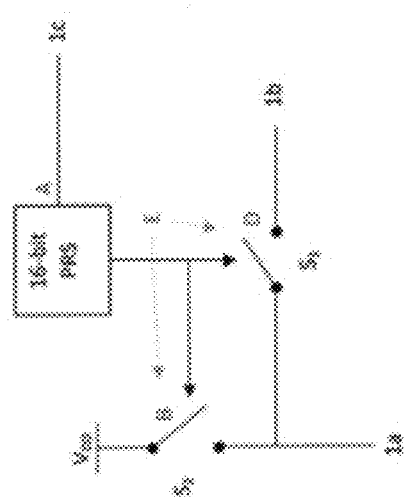
FIG. 6A is a diagram showing detail no. 1 of FIG. 5—the IDAC Modulator Sub-unit.

Referring to FIG. 6A, detail 1 of FIG. 5, the IDAC Modulator Sub-unit, is shown and includes the following steps:

A. To start, the 16-bit PRS will receive the amplified oscillator signal and control switches $S_2$ and $S_3$.

B. When the PRS receives a high signal, $S_2$ will be closed, allowing electricity to flow from the voltage source through wire 1a and into capacitor $C_x$.

C. On main flowchart of FIG. 5, the capacitor $C_x$ will be charged by the electricity flowing through wire 1a.

D. When the PRS receives a low signal, $S_2$ will trip and stop the flow of electricity from the source to $C_x$. Simultaneously, $S_3$ will be closed, allowing the capacitor $C_x$ to discharge onto $C_{MOD}$ (also found on the main flowchart of FIG. 5).

E. Steps B-D will continue to repeat over and over again as the modulator continuously supplies power to the rest of the capsense circuit.

Referring now to FIG. 5, the main flow chart diagram is shown and includes the following additional steps:

F. The voltage of $C_{MOD}$, an external capacitor, is always being monitored by a comparator. The voltage on the capacitor slowly creeps up as the modulator supplies more and more electricity to $C_{MOD}$ by continually discharging $C_x$ onto $C_{MOD}$.

G. When the voltage on $C_{MOD}$ is greater than the reference voltage, the comparator will output a high signal. This will start a clock which is controlled by the same oscillator as the modulator sub-unit. During this time, the voltage on $C_{MOD}$ will continue to rise as the modulator continues to supply electricity to the capacitor.

H. Once the clock expires, two signals will be sent: one high signal will go to the logical AND gate and the other signal will be sent to the switch modulator for $S_1$.

I. The signal sent to the AND gate will be wait until the ADCPWM also outputs a high signal.

Referring to FIG. 6C, detail 3 of FIG. 5, the Switch Modulator, is shown and includes the following additional steps:

J. The signal sent to the switch modulator will automatically be sent to the switch $S_1$. This will give a path for capacitor $C_{MOD}$ to discharge, making the voltage go below the reference voltage and continue to decline. Additionally, the timer involved in the switch modulator will also be triggered.

K. Once the timer has expired, $S_1$ will be opened again, allowing the capacitor to regain a charge and approach the reference voltage again.

Referring back now to FIG. 5, the following additional steps are illustrated:

L. The ADCPWM will turn a wave oscillator into discrete high and low signals to be read by login gates. When the ADCPWM decides that the signal should be high, it will report a high signal to the logical AND gate.

M. Once the logical AND gate has both the step I and step L high signals, it will return a high signal to the 16-bit timer. This will allow the timer to start counting based on the frequency of the oscillator.

N. The counts produced by the timer will be converted into raw counts, which are the easy way for the computer to analyze how many times both the voltage of the capacitor $C_{MOD}$ has been above the reference voltage and the ACPWM has been high. These raw counts are the best way for the computer to quantify the ratio of time above the reference voltage to time below the reference voltage.

O. When the 16-bit timer is no longer enabled, the raw count is recorded and stored as a data point. Using threshold analysis on many consecutive data points (many different raw counts), the capacitive sensing mechanism will be able to determine if the button is pressed.

Figure 8:
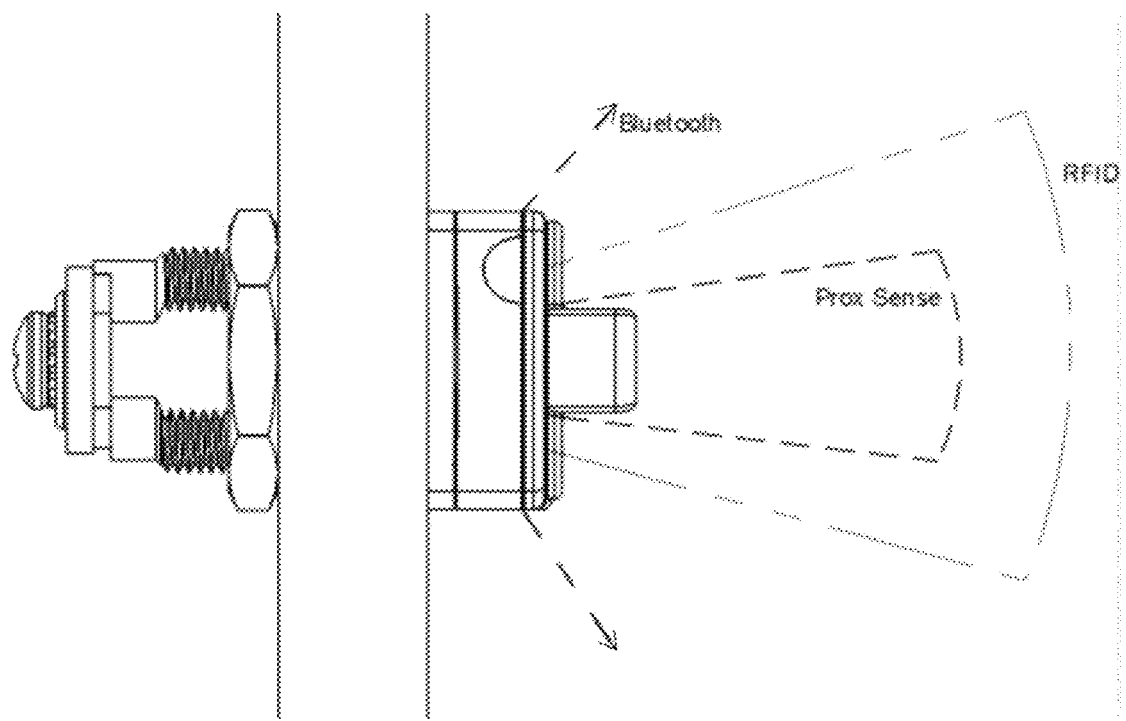
FIG. 8 is a side view of the wireless lock illustrating schematically the detection or signal scope/range of the Prox Sense, the RFID and the Bluetooth access control electronics of the present disclosure.
Figure 9:
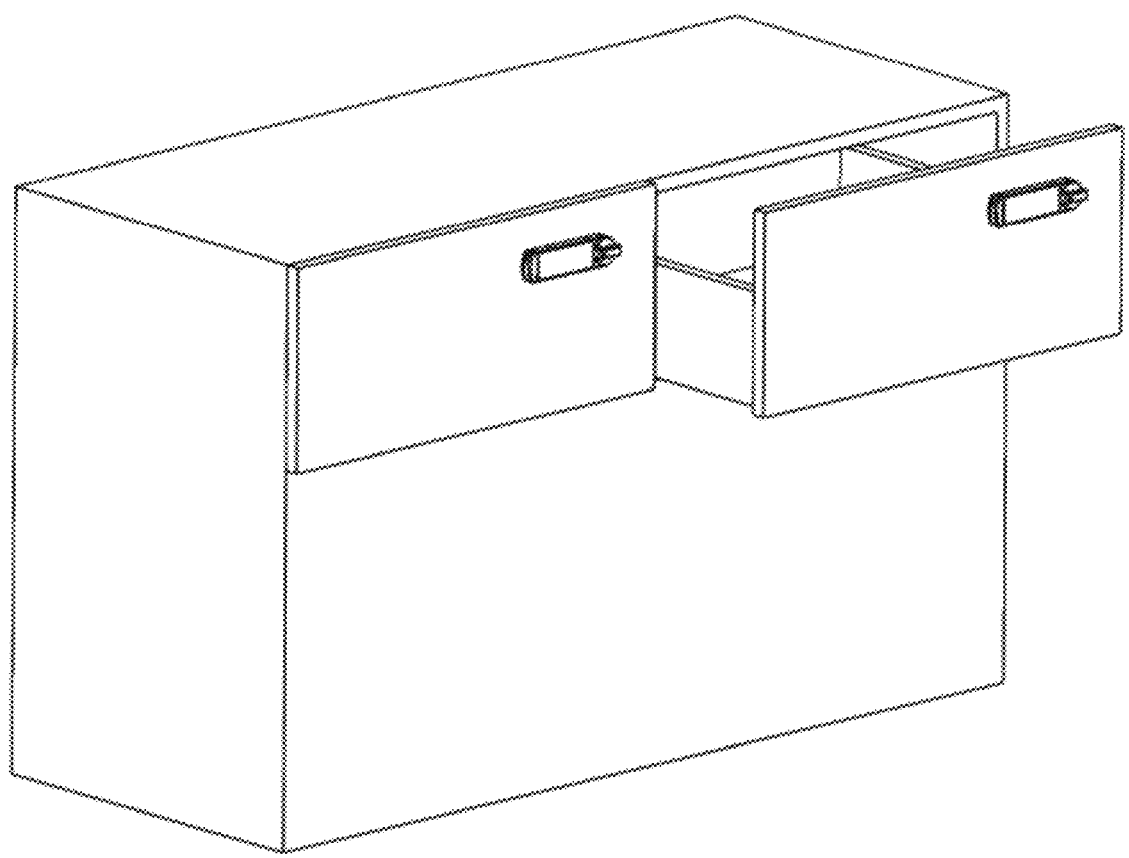
FIG. 9 is a perspective view illustrating the wireless lock mounted to the drawers of a secured enclosure.

FIG. 8 shows a side view of the lock mounted to a secured enclosure, for example mounted to the drawers of a cabinet as shown in FIG. 9. FIG. 8 also depicts schematically the detection or signal scope/range of the Prox Sense, the RFID and the Bluetooth access control electronics.

In one embodiment, to reduce power, it is desired to maintain a very limited angle and distance of the prox detection, as well as a narrower angle and/or shorter distance of the Prox detect compared to the RFID signals, as illustrated in FIG. 8.

In another embodiment, to increase speed of reading the prox cards, it is preferred to have the Prox Sense to be at the wider range and longer distance compared to the RFID signals that are set at a more narrow range and shorter distance, generally the reverse or opposite of the scope/ranges depicted in FIG. 8 with respect to the Prox sense and RFID signals.

Accordingly, it should be understood that different ranges of the Prox sense and the RFID signals can be set as desired for different purposes, e.g., increased speed vs. reduced power. The range and the angles are influenced by a number of factors. First, the range and the angles are influenced by the positioning of the sensor pads and antennas with respect to each other in the x, y and z axes. Second, the range and the angles are influenced by the size and surface area of the sensor pads and the antennas.

For example, since one pad 507 is smaller on surface 501 than antenna 508, then the prox detect will be less sensitive, more power efficient but slower to detect. If multiple pads are used for prox detection, then it will be faster to detect but less power efficient.

Other factors which influence theses ranges and the angles are the modulator frequency and other adjustments to the circuit in FIG. 5.

Typically the Bluetooth signal is expected to be the widest and the farthest in terms of angle and distance/range compared to the others.

While the embodiment(s) disclosed herein are illustrative of the structure, function and operation of the exemplary method(s), circuitry, equipment and device(s), it should be understood that various modifications may be made thereto with departing from the teachings herein. Further, the components of the method(s), circuitry, equipment and device(s) disclosed herein can take any suitable form, including any suitable hardware, software, circuitry or other components capable of adequately performing their respective intended functions, as may be known in the art.

While the foregoing discussion presents the teachings in an exemplary fashion with respect to the disclosed method(s), circuitry, equipment, and device(s) for access control electronics for locks, it will be apparent to those skilled in the art that the present disclosure may apply to other method(s), system(s), device(s), equipment and circuitry for providing secured access to enclosures, other structures and/or controlled areas. Further, while the foregoing has described what are considered to be the best mode and/or other examples, it is understood that various modifications may be made therein and that the subject matter disclosed herein may be implemented in various forms and examples, and that the method(s), system(s), device(s), equipment and circuitry may be applied in numerous applications, only some of which have been described herein.

What is claimed is:

1. Access control electronics for wireless locks comprising:
    a processor;
    a proximity detection circuit operatively connected to the processor, wherein the proximity detection circuit includes at least one proximity sensor pad and a periodically enabled capacitive sensing circuit operatively connected to the at least one proximity sensor pad, wherein the periodically enabled capacitive sensing circuit and the at least one proximity sensor pad are configured tbr sensing a wireless transmitting device; and
    at least one of a Bluetooth antenna and a short-range radio frequency antenna operatively connected to the processor for reading the wireless transmitting device.

2. The access control electronics of claim 1, wherein the wireless transmitting device is a portable smartphone.

3. The access control electronics of claim 1, wherein the Bluetooth antenna is configured to read a Bluetooth signal from the wireless transmitting device.

4. The access control electronics of claim 1, wherein the short-range radio frequency antenna is configured to read a Near Field Communication (NFC) signal from the wireless transmitting device.

5. The access control electronics of claim 1, wherein the at least one of a Bluetooth antenna and a short-range radio frequency antenna comprises both a Bluetooth antenna and a short-range radio frequency antenna operatively connected to the processor for selectively reading the wireless transmitting device.

6. Access control electronics for wireless locks comprising:
    a processor;
    a proximity detection circuit operatively connected to the processor, wherein the proximity detection circuit includes at least one proximity sensor pad and a periodically enabled capacitive sensing circuit operatively connected to the at least one proximity sensor pad, wherein the periodically enabled capacitive sensing circuit and the at least one proximity sensor pad are configured for sensing the presence of a user; and
    at least one of a Bluetooth antenna and a short-range radio frequency antenna operatively connected to the processor ibr reading a wireless transmitting device.

7. The access control electronics of claim 6, wherein the wireless transmitting device is a portable smartphone.

8. The access control electronics of claim 6, wherein the Bluetooth antenna is configured to read a Bluetooth signal from the wireless transmitting device.

9. The access control electronics of claim 6, wherein the short-range radio frequency antenna is configured to read a Near Field Communication (NFC) signal from the wireless transmitting device.

10. The access control electronics of claim 6, wherein the at least one of a Bluetooth antenna and a short-range radio frequency antenna comprises both a Bluetooth antenna and a short-range radio frequency antenna operatively connected to the processor for selectively reading the wireless transmitting device.

11. A wirelessly accessed lock for selectively locking and unlocking a container, the lock comprising:
    a housing li axing a lock and latch mechanism;
    a processor in the housing;
    a proximity detection circuit in the housing and being operatively connected to the processor, wherein the proximity detection circuit comprises at least one proximity sensor pad and a periodically enabled capacitive sensing circuit operatively connected to the at least one proximity sensor pad, and wherein the periodically enabled capacitive sensing circuit and the at least one proximity sensor pad are configured for sensing at least one of a presence of a user and a wireless transmitting device; and
    at least one of a Bluetooth antenna and a short-range radio frequency antenna in the housing and being operatively connected to the processor for reading the wireless transmitting device.

12. The wirelessly accessed lock of claim 11, wherein the wireless transmitting device is a portable smartphone.

13. The wirelessly accessed lock of claim 11, wherein the Bluetooth antenna is configured to read a Bluetooth signal from the wireless transmitting device.

14. The wirelessly accessed lock of claim 11, wherein the short-range radio frequency antenna is configured to read a Near Field Communication (NFC) signal from the wireless transmitting device.

15. The wirelessly accessed lock of claim 11, wherein the at least one of a Bluetooth antenna and a short-range radio frequency antenna comprises both Bluetooth antenna and a short-range radio frequency antenna operatively connected to the processor for selectively reading the wireless transmitting device.

16. A method of wirelessly accessing a lock for selectively locking and unlocking container, the method comprising the steps of:
    operatively connecting a processor to a proximity detection circuit, wherein the proximity detection circuit includes at least one proximity sensor pad operatively connected to a periodically enabled capacitive sensing circuit;
    operatively connecting at least one of a Bluetooth antenna and a short-range radio frequency antenna to the processor;
    periodically enabling the capacitive sensing circuit so that the at least one proximity sensor pad is able to sense at least one of a presence of a user and a wireless transmitting device while the capacitive sensing circuit is enabled;
    sensing a wireless transmitting device via the proximity detection circuit;
    reading the wireless transmitting device through the at least one of a Bluetooth antenna and a short-range radio frequency antenna.

17. The method of claim 16, wherein the wireless transmitting device is a portable smartphone.

18. The method of claim 16, further comprising the step of reading via the Bluetooth antenna a Bluetooth signal from the wireless transmitting device.

19. The method of claim 16, further comprising the step of reading via the short-range radio frequency antenna a Near Field Communication (NFC) signal from the wireless transmitting device.

20. The method of claim 16, Wherein the step of operatively connecting at least one of a Bluetooth antenna and a short-range radio frequency antenna to the processor comprises the steps of operatively connection a Bluetooth antenna to the processor for selectively reading the wireless transmitting device, and operatively connecting a short-range radio frequency antenna to the processor for selectively reading the wireless transmitting device.

\* \* \* \* \*